(12) United States Patent
Wang (10) Patent No.: US 9,639,409 B2
(45) Date of Patent: May 2, 2017

(54) DEVICE AND METHOD FOR COMMUNICATING BETWEEN CORES

(71) Applicant: ZTE Corporation, Shenzhen (CN)

(72) Inventor: Peng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/434,245

(22) PCT Filed: Oct. 8, 2013

(86) PCT No.: PCT/CN2013/084831
§ 371 (c)(1),
(2) Date: Apr. 8, 2015

(87) PCT Pub. No.: WO2014/056420
PCT Pub. Date: Apr. 17, 2014

(65) Prior Publication Data
US 2015/0261586 A1    Sep. 17, 2015

(30) Foreign Application Priority Data

Oct. 12, 2012 (CN) .......................... 2012 1 0389118

(51) Int. Cl.
*G06F 3/00* (2006.01)
*G06F 9/44* (2006.01)
(Continued)

(52) U.S. Cl.
CPC ................ *G06F 9/546* (2013.01); *G06F 9/52* (2013.01); *G06F 9/544* (2013.01); *G06F 13/24* (2013.01);
(Continued)

(58) Field of Classification Search
None
See application file for complete search history.

(56) References Cited

U.S. PATENT DOCUMENTS 5,901,326 A * 5/1999 Gildea et al. ...................... 710/5
6,456,628 B1 * 9/2002 Greim et al. .................. 370/466
(Continued)

FOREIGN PATENT DOCUMENTS

| CN | 1246761 A | 3/2000 |
| CN | 101593159 A | 12/2009 |
| CN | 102394732 A | 3/2012 |

OTHER PUBLICATIONS

International Search Report for corresponding application PCT/CN2013/084831 filed Oct. 8, 2013; Mail date Jan. 16, 2014.

*Primary Examiner* — Tuan Dao
*Assistant Examiner* — William C Wood
(74) *Attorney, Agent, or Firm* — Cantor Colburn LLP (57) ABSTRACT

A device and method for communicating between cores are provided. The device comprises: a postbox component, configured to store a message sent from a message sending core to a message receiving core and notify the message receiving core to read the message; and a bus adapter component, connected between the postbox component and the message receiving core and the message sending core which communicate with each other and configured to provide read/write interfaces of the postbox component and the message receiving core and the message sending core. By means of the disclosure, the problems that the device and method for communicating between cores with high complexity, poor timeliness and poor expandability during multi-core application in the related art are solved, thereby achieving the effects of reducing the communication between cores complexity significantly, reducing communication time delay and having excellent expandability and scalability.

8 Claims, 7 Drawing Sheets

(51) Int. Cl.
 *G06F 9/46* (2006.01)
 *G06F 13/00* (2006.01)
 *G06F 9/54* (2006.01)
 *G06F 15/167* (2006.01)
 *G06F 13/24* (2006.01)
 *G06F 9/52* (2006.01)

(52) U.S. Cl.
 CPC ...... *G06F 15/167* (2013.01); *G06F 2209/521* (2013.01)

(56) References Cited

U.S. PATENT DOCUMENTS

| | | | | |
|---|---|---|---|---|
| 6,817,018 | B1* | 11/2004 | Clarke et al. | 719/313 |
| 7,606,254 | B1* | 10/2009 | Hardin et al. | 370/428 |
| 2002/0116595 | A1* | 8/2002 | Morton | 712/22 |
| 2005/0060450 | A1* | 3/2005 | Tsai | 710/100 |

* cited by examiner

DEVICE AND METHOD FOR COMMUNICATING BETWEEN CORES

TECHNICAL FIELD

The disclosure relates to the field of high-performance chip design, including e.g., a device and method for communicating between cores.

BACKGROUND

With multi-core processors are more widely applied to various technical fields, the advantages of strong parallel computing capability, low power consumption and high integration have been gradually accepted by the market. The salient feature of the multi-core processor is that the same task can be broken down to threads or processes of a plurality of cores for parallel running, and such parallelism brings a significant improvement of performance. However, while bringing the improvement of performance, the multi-core processor also brings a series of problems such as frequent communication tasks between cores and complex management on communication between cores, furthermore, with more and more cores being integrated on the same chip, this problem becomes more and more prominent. Therefore, a high speed and efficient communication device and method between cores become one of the key technologies for the chip of the multi-core processor.

In the related art, the communication between cores is generally based on a shared memory. Such as, the patent "Method and Device for Communicating between cores of the Multi-core Processor in Embedded Real-time Operating System" as described in Patent number CN200510087321, where a shared memory is used to realize a sharing message pool and a message data pipeline which are required by communication between cores. It is required operating system software to create a message queue in this method, and an operation of establishing pipelines for communication between cores is needed, and therefore the complexity is relatively high; more critically, in order to complete the consistency to access the multi-core shared message memory, it is required to use spin lock resources and additional synchronous operations such as applying for a lock and releasing a lock, these complex software interaction steps will greatly reduce the efficiency of communication between cores, at the same time, the reliability is reduced while greatly increasing the number of cores, and the separated message operation and interrupt notification mechanism also will lead to the reduction of the efficiency. In addition, the method based on the shared memory brings a larger increase of uncertainty on communication timeliness because the messages between cores must share the same bandwidth with data.

In order to solve the problems of high complexity and high time delay of the communication between cores mechanism based on the shared memory, some improved methods are also produced. Such as the patent "Method and System for Generating and Delivering Inter-Processor Interrupts in a Multi-Core Processor and in Certain Shared Memory Multi-Processor Systems" as described in patent number US20080988459, where a shared storage area is designated by operating a group of specialized Interrupt Mask Register (IMR) through software, and an interrupt between cores is automatically triggered to generate when a write operation aims at the designated shared storage area. However, the message is stored in a circular buffer of the shared memory area, and is still need to be performed by circular buffering access through a data structure realized by the software, and the interrupt generated by the message notification is generated by the IMR. It still needs to pre-set the IMR, and factors such as the separation of the register operation and the message operation and many software interaction steps directly lead to relatively large time delay and complex software programming of the communication between cores, so that the requirement of high-performance multi-core communication cannot be met. Meanwhile, the patent also fails to solve the problems of resource consumption and increased complexity brought by the fact that the mutual exclusion operation must be introduced in order to ensure the reliability of communication between cores.

Except for the major defects mentioned above that the existing technology of the communication between cores with low communication efficiency and the timeliness cannot being ensured, the existing communication between cores technology needs more hardware resources and more complex software processing steps when the number of cores is obviously increased, in a heterogeneous multi-core system, the differences in supporting the frequency of the core, the interface structure and the data structure also greatly increase the software complexity of the existing method of communication between cores, and the compatibility and reliability of the heterogeneous core communication program is insufficient. That is, the expandability and flexibility of the existing technology of the communication between cores is insufficient while adapting to the heterogeneous core and the increase in the number of cores.

Therefore, the problems of high complexity, poor timeliness and poor expandability during multi-core application exist in the related art.

SUMMARY

A device for communicating between cores is provided in the disclosure to at least solve the problems of high complexity, poor timeliness and poor expandability during multi-core application existing in the related art.

According to an aspect of the disclosure, a device for communicating between cores, comprising: a postbox component, configured to store a message sent from a message sending core to a message receiving core and notify the message receiving core to read the message; and a bus adapter component, connected between the postbox component and the message receiving core and the message sending core which communicate with each other and configured to provide read/write interfaces of the postbox component and the message receiving core and the message sending core.

According to an embodiment of the disclosure, the device further comprising: an arbiter component, configured to, when a plurality of cores simultaneously initiate read/write access requests for requesting a read/write message to the postbox component, arbitrate a plurality of read/write access requests according to a predetermined rule and output the plurality of read/write access requests serially and sequentially.

According to an embodiment of the disclosure, the postbox component comprises: a bus interface element, configured to achieve a mutual exclusion of a read/write message by multiplexing a bus error feedback register.

According to an embodiment of the disclosure, the bus interface element comprises: a first mutual exclusion element, configured to achieve a function of a mutual exclusion lock by multiplexing the bus error feedback register, so as to achieve a mutual exclusion of a plurality of message sending cores writing messages to the postbox component; and/or a second mutual exclusion element, configured to achieve a function of a mutual exclusion lock by multiplexing the bus error feedback register, so as to achieve a mutual exclusion of a message sending core writing a message to the postbox component and a message receiving core reading a message from the postbox component.

According to an embodiment of the disclosure, the bus interface element further comprises: a triggering subelement, configured to trigger a state of the bus error feedback register to change after the message sending core writes a message to the postbox component, or the message receiving core reads a message from the postbox component.

According to an embodiment of the disclosure, the postbox component comprises:

a storage element, configured to store the message according to a message access address.

According to an embodiment of the disclosure, the postbox component comprises: a notifying element, configured to notify the message receiving core to receive a message by an interrupt request.

According to another embodiment of the disclosure, a method for communicating between cores, comprising: receiving, by a postbox component, a message sent from a message sending core through a bus adapter component; and sending, by the postbox component, an interrupt request to a message receiving core, wherein the message receiving core reads the message according to the interrupt request.

According to an embodiment of the disclosure, the method further comprising: when a plurality of cores simultaneously initiate read/write access requests for requesting a read/write message to the postbox component, arbitrating a plurality of read/write access requests according to a predetermined rule and outputting the plurality of read/write access requests serially and sequentially.

According to an embodiment of the disclosure, the method further comprising: when a plurality of cores simultaneously initiate read/write access requests for requesting a read/write message to the postbox component, achieving a mutual exclusion of the read/write message by multiplexing a bus error feedback register.

According to an embodiment of the disclosure, achieving the mutual exclusion of the read/write message by multiplexing a bus error feedback register comprises: achieving a function of a mutual exclusion lock by multiplexing the bus error feedback register, so as to achieve a mutual exclusion of a plurality of message sending cores writing messages to the postbox component; and/or achieving a function of a mutual exclusion lock by multiplexing the bus error feedback register, so as to achieve a mutual exclusion of a message sending core writing a message to the postbox component and a message receiving core reading a message from the postbox component.

According to an embodiment of the disclosure, the method further comprising: triggering a state of the bus error feedback register to change after the message sending core writes a message to the postbox component, or the message receiving core reads a message from the postbox component.

According to an embodiment of the disclosure, the postbox component sends a first response message to the message sending core after the message sending core writes a message to the postbox component, wherein the message sending core determines that the message sending core successfully writes the message to the postbox component according to the first response message; and/or the postbox component sends a second response message to the message receiving core after the message receiving core reads a message from the postbox component, wherein the message receiving core determines that the message receiving core successfully reads the message according to the second response message.

According to an embodiment of the disclosure, the method further comprising clearing, by the postbox component, the interrupt request after the message receiving core receives the message.

According to still another embodiment of the disclosure, a device for communicating between cores, comprising: a receiving element, located in a postbox component, configured to receive a message sent from a message sending core through a bus adapter component; and a sending element, located in the postbox component, configured to send an interrupt request to a message receiving core, wherein the message receiving core reads the message according to the interrupt request.

By using a postbox component which is configured to store a message sent from a message sending core to a message receiving core and notify the message receiving core to read the message and a bus adapter component which is connected between the postbox component and the message receiving core and the message sending core which communicate with each other and configured to provide read/write interfaces of the postbox component and the message receiving core and the message sending core, the disclosure solves the problems in the related art that the communication between cores network and method have the problems of high complexity, poor timeliness and poor expandability during multi-core application, thereby achieving the effects of reducing the communication between cores complexity significantly, reducing communication time delay and having excellent expandability and scalability.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
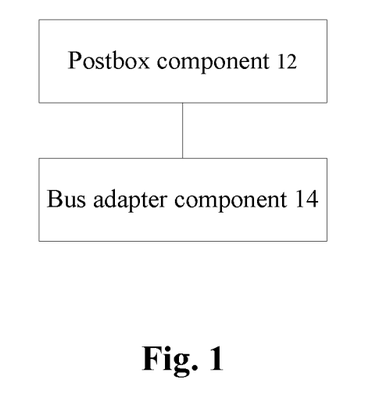
FIG. 1 is a structural block diagram of a device for communicating between cores according to an embodiment of the disclosure.

A device for communicating between cores is provided in this embodiment, FIG. 1 is a structural block diagram of a device for communicating between cores according to an embodiment of the disclosure, as shown in FIG. 1, the device for communicating between cores comprises a postbox component 12 and a bus adapter component 14, the device is described below.

The postbox component 12 is configured to store the message sent from a message sending core to a message receiving core and notify the message receiving core to read the message; the bus adapter component 14 is connected with the postbox component 12, is located between the postbox component and the message receiving core and the message sending core which communicate with each other and is configured to provide read/write interfaces of the postbox component and the message receiving core and the message sending core.

By means of the device for communicating between cores which only uses a framework formed by the postbox component and the bus adapter component connected between the message receiving core and the message sending core, with respect to the mode of using a shared memory or the mode of using a special interrupt cooperation shared memory in the related art, in which many software interactions lead to the problems of complex steps, low inefficiency and poor flexibility in the communication between cores, the device for communicating between cores using the simple framework formed by the postbox component and the bus adapter component significantly reduces the complexity of the communication between cores and effectively reduces the communication time delay by the read/write message access of the device for communicating between cores itself and a feedback for responding to the read/write message access, which can be achieved just by increasing components, thereby having better expandability and scalability.

Figure 2:
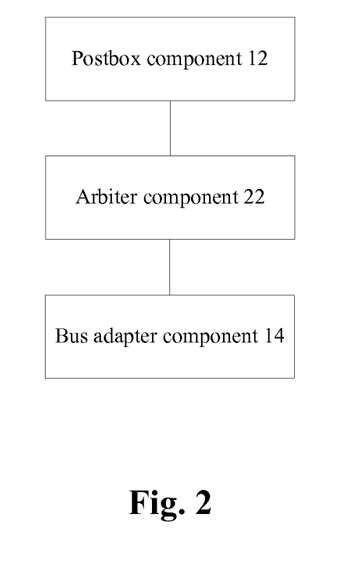
FIG. 2 is a preferred structural block diagram of the device for communicating between cores according to an embodiment of the disclosure.

FIG. 2 is a preferred structural block diagram of the device for communicating between cores according to an embodiment of the disclosure, as shown in FIG. 2, besides comprising all the components as shown in FIG. 1, the device further comprises an arbiter component 22 which is connected between the postbox component 12 and the bus adapter component 14 and is configured to, when a plurality of cores simultaneously initiate read/write access requests for requesting a read/write message to the postbox component, arbitrate a plurality of read/write access requests according to a predetermined rule and output the plurality of read/write access requests serially and sequentially.

Figure 3:
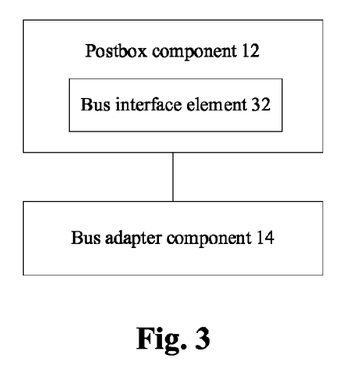
FIG. 3 is a preferred structural block diagram I of a postbox component 12 in the device for communicating between cores according to an embodiment of the disclosure.

FIG. 3 is a preferred structural block diagram I of a postbox component 12 in the device for communicating between cores according to an embodiment of the disclosure, as shown in FIG. 3, the postbox component 12 comprises a bus interface element 32 which is configured to achieve the mutual exclusion of the read/write message by multiplexing a bus error feedback register.

Figure 4:
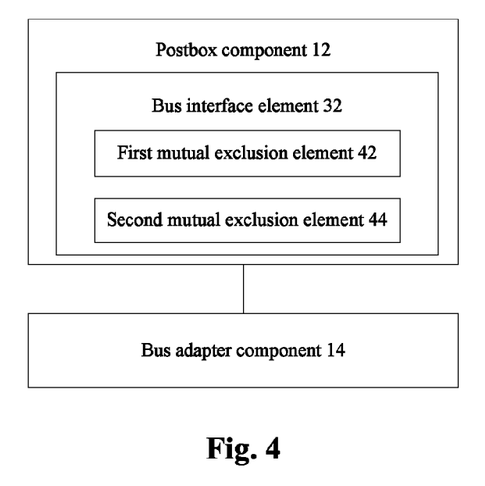
FIG. 4 is a preferred structural block diagram of a bus interface element 32 in a postbox component 12 of the device for communicating between cores according to an embodiment of the disclosure.

FIG. 4 is a preferred structural block of the bus interface element 32 in the postbox component 12 in the device for communicating between cores according to an embodiment of the disclosure, as shown in FIG. 4, the bus interface element 32 comprises a first mutual exclusion element 42 and/or a second mutual exclusion element 44, and the bus interface element 32 is described below.

The first mutual exclusion element 42 is configured to achieve the function of a mutual exclusion lock by multiplexing the bus error feedback register, so as to achieve the mutual exclusion of a plurality of message sending cores writing messages to the postbox component; and/or the second mutual exclusion element 44 is configured to achieve the function of a mutual exclusion lock by multiplexing the bus error feedback register, so as to achieve the mutual exclusion of a message sending core writing a message to the postbox component and a message receiving core reading a message from the postbox component.

Figure 5:
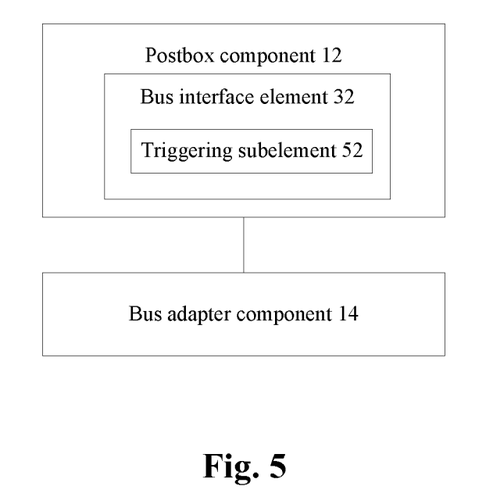
FIG. 5 is a preferred structural block diagram of a bus interface element 32 in the device for communicating between cores according to an embodiment of the disclosure.

FIG. 5 is a preferred structural block diagram of a bus interface element 32 in the device for communicating between cores according to an embodiment of the disclosure, as shown in FIG. 5, the bus interface element 32 comprises a triggering subelement 52 which is configured to trigger the state of the bus error feedback register to change after the message sending core writes the message to the postbox component or the message receiving core reads the message from the postbox component.

Figure 6:
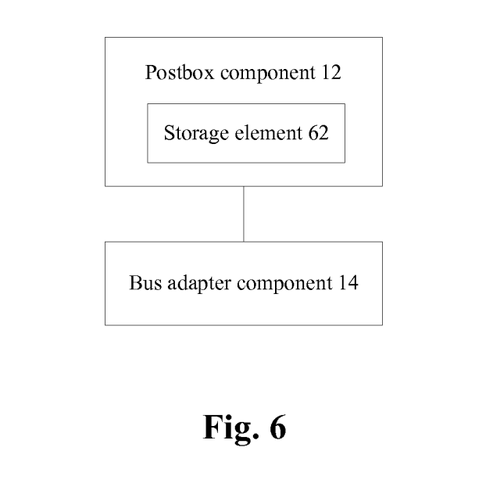
FIG. 6 is a preferred structural block diagram II of a postbox component 12 in the device for communicating between cores according to an embodiment of the disclosure.

FIG. 6 is a preferred structural block diagram II of the postbox component 12 in the device for communicating between cores according to an embodiment of the disclosure, as shown in FIG. 6, the postbox component 12 comprises a storage element 62 which is configured to store the message according to a message access address.

Figure 7:
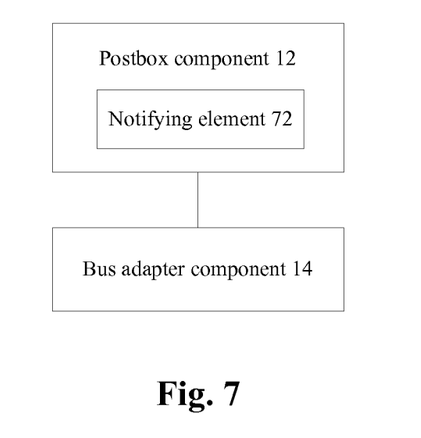
FIG. 7 is a preferred structural block diagram III of a postbox component 12 in the device for communicating between cores according to an embodiment of the disclosure.

FIG. 7 is a preferred structural block diagram III of the postbox component 12 in the device for communicating between cores according to an embodiment of the disclosure, as shown in FIG. 7, the postbox component 12 comprises a notifying element 72 which is configured to notify the message receiving core to receive a message by an interrupt request.

Figure 8:
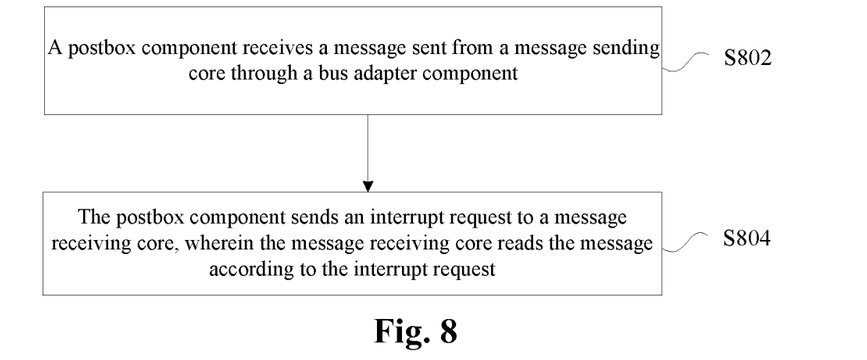
FIG. 8 is a flowchart of a method for communicating between cores according to an embodiment of the disclosure.

A method for communicating between cores is further provided in this embodiment, FIG. 8 is a flowchart of a method for communicating between cores according to an embodiment of the disclosure, as shown in FIG. 8, and the flowchart comprises the following steps.

Step S802, a postbox component receives a message sent from a message sending core through a bus adapter component.

Step S804, the postbox component sends an interrupt request to a message receiving core, wherein the message receiving core reads the message according to the interrupt request.

By means of the steps, the communication between cores is realized by the combination of the postbox component and the bus adapter component, with respect to the mode of using a shared memory or the mode of using a special interrupt cooperation shared memory in the related art, in which many software interactions lead to the problems of complex steps, low inefficiency and poor flexibility of the communication between cores, the process in the embodiment is simple, and the communication between cores can be achieved only by the read/write message access itself, the complexity of the communication between cores is significantly reduced, and efficiency of the communication between cores is effectively improved to some extent.

According to an embodiment of the disclosure, when a plurality of cores simultaneously initiate read/write access requests for requesting a read/write message to the postbox component, a plurality of read/write access requests may be arbitrated according to a predetermined rule, and the plurality of read/write access requests are output serially and sequentially. It should be noted that the plurality of cores may be a plurality of message sending cores, also may be a plurality of message receiving cores and also may be the mixture of the two. Before the read/write access is performed, arbitration processing is performed on the read/write access request so as to avoid the disorder of the communication between cores. In addition, the arbiter component may be flexibly selected according to the specific number of the plurality of cores for performing the communication between cores, for example, when the number of the cores for performing the communication between cores is relatively small, the arbiter component may not be used, and when the number of the cores for performing the communication between cores is relatively large, one or more arbiter components may be selected for processing.

When a plurality of cores simultaneously initiate read/write access requests for requesting a read/write message to the postbox component, the mutual exclusion of the read/write message is achieved by multiplexing a bus error feedback register. The mutual exclusion of the read/write messages is realized by using the existing bus error feedback register in the communication between cores, with respect to the related art that it needs to add an additional mutual exclusion device and an additional mutual exclusion operation step to realize the mutual exclusion function, not only the interaction between the communication between cores network and the external structure can be reduced, but also the consumption of resources is reduced to some extent.

It should be noted that, for the abnormal case which easily happens during the communication between cores, the mutual exclusion of the read/write messages can be better realized by multiplexing the bus error feedback register, for example, the function of a mutual exclusion lock is achieved by multiplexing the bus error feedback register, so as to achieve the mutual exclusion of a plurality of message sending cores writing messages to the postbox component; for another example, the function of a mutual exclusion lock is achieved by multiplexing the bus error feedback register, so as to achieve the mutual exclusion of the message sending core writing the message to the postbox component and the message receiving core reading the message from the postbox component. Of course, the two can be combined for use. In the operation, after the message sending core writes a message to the postbox component, or the message receiving core reads a message from the postbox component, the change of the read/write state of the postbox component is realized by triggering the change of the state of the bus error feedback register, thereby avoiding the lose of messages, realizing the ordering of read/write and ensuring the reliability of reading/writing messages.

According to an embodiment of the disclosure, the postbox component sends a first response message to the message sending core after the message sending core writes a message to the postbox component, wherein the message sending core determines that the message sending core successfully writes the message to the postbox component according to the first response message; and/or the postbox component sends a second response message to the message receiving core after the message receiving core reads a message from the postbox component, wherein the message receiving core determines that the message receiving core successfully reads the message according to the second response message. The postbox component automatically clears the interrupt request after it is determined that the message receiving core receives the message, so that it is convenient to generate a new interrupt request when a new message is subsequently written in, so that the corresponding performance of read/write messages is ensured, and the operation step of the receiving core clearing the interrupt request is reduced.

A device for communicating between cores is further provided in this embodiment, the device is used for realizing the examples and preferred embodiments, and what has been described is not repeated. As used hereinafter, the term "component" may realize hardware and/or software combination with a predetermined function. Although the device described in the following embodiment is preferably implemented by hardware, but the software, or a combination of software and hardware also possibly be conceived.

Figure 9:
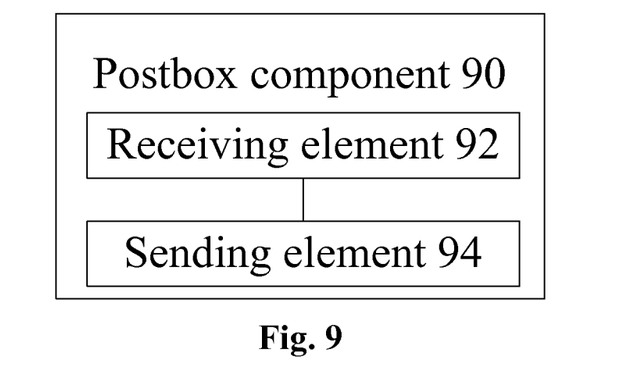
FIG. 9 is a structural block diagram of a device for communicating between cores according to an embodiment of the disclosure.

FIG. 9 is a structural block diagram of a device for communicating between cores according to an embodiment of the disclosure, as shown in FIG. 9, the device is located in the postbox component 90 and comprises a receiving element 92 and a sending element 94, and the device is described below.

The receiving element 92 is configured to receive a message sent from a message sending core through a bus adapter component; and the sending element 94 is connected to the receiving element 92 and is configured to send an interrupt request to a message receiving core, wherein the message receiving core reads the message according to the interrupt request.

Figure 10:
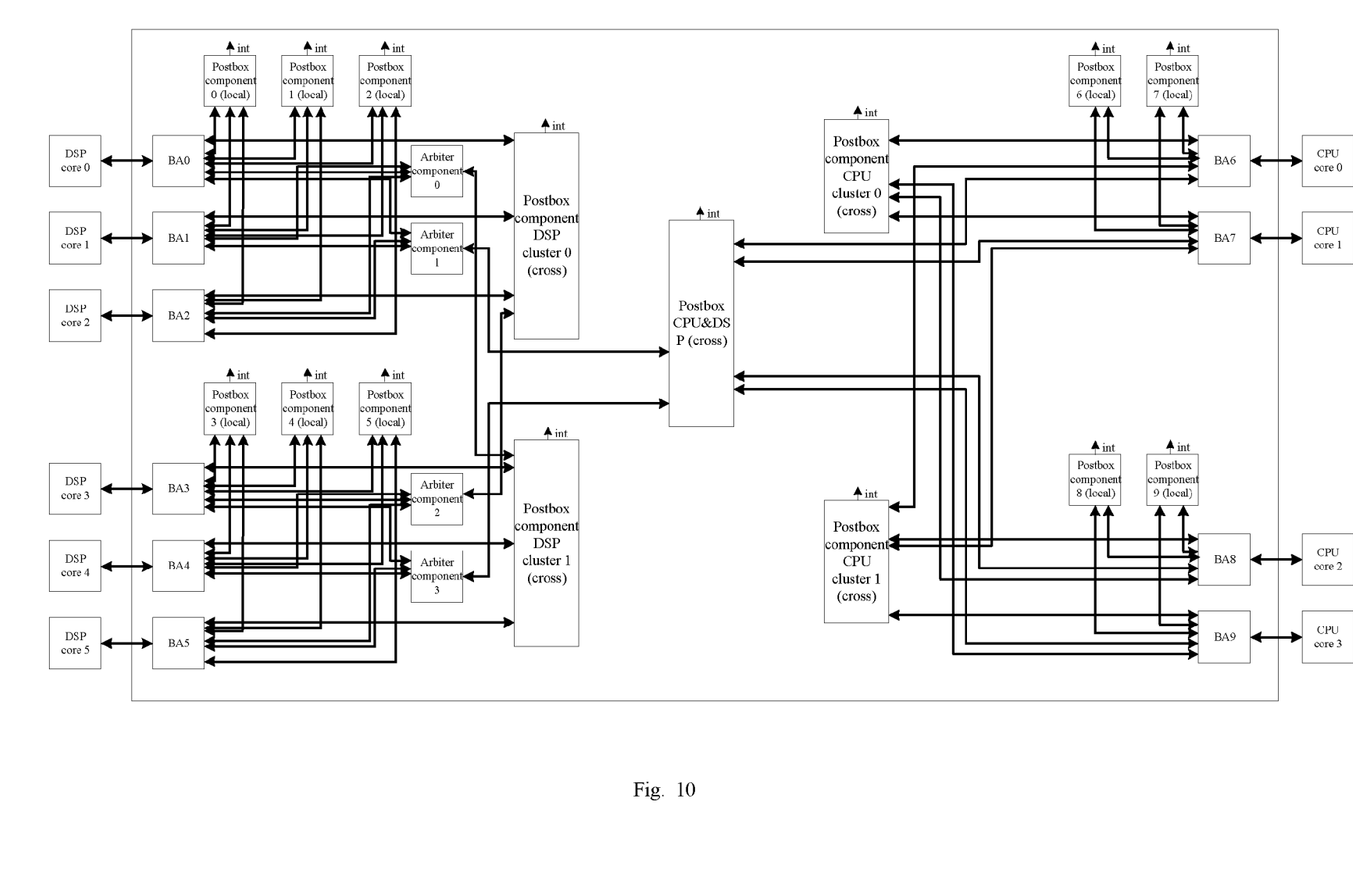
FIG. 10 is a structural block diagram of the device for communicating between cores of a multi-core chip according to an embodiment of the disclosure.

In order to solve the problems of high complexity, poor timeliness and poor expandability during multi-core application existing in the related art, a novel Inter-core Communication Network (for the convenience of narration, the Communication between cores is short for ICN, that is, the above device for communicating cores) is provided in the this embodiment, the ICN comprises any number of the following three types of components, a Postbox component (being the same as the postbox component 12), a Bus Adapter component (BA) (being the same as the bus adapter component 14) and an arbiter component (Arbiter) (being the same as the arbiter component 22). The ICN can be applied to using a hierarchical structure so as to meet the application scenario of a significantly increased number of cores and heterogeneous cores. FIG. 10 is a structural block diagram of the device for communicating between cores of a multi-core chip according to an embodiment of the disclosure, as shown in FIG. 10, the structure comprises a postbox component, a bus adapter component and an arbiter component. The device is described respectively below.

(1) Postbox Component

A message needs to be temporarily stored in some place for a receiving core to read, a reliable mechanism for notifying the receiving core of the arrival of the message is to be provided, and there are several Postbox components in the ICN provided in this embodiment. In order to meet the requirements, the postbox component provides the following functions: mutually-exclusion for reading/writing messages, message storage, generating and notifying an interrupt request.

In order to achieve the functions of the postbox component, which may be completed by the Postbox component by means of the following elements, i.e. the Postbox component comprises a plurality of Bus Interface Units (BIU), a plurality of message storage elements (RegFiles) and a plurality of interrupt generation elements (IntGen). Various elements included in the Postbox component are respectively described below.

The BIU is configured to realize the mutual exclusion access function of the read/write message. The BIU provides a message reading channel of a message receiving core and a plurality of message writing channels of a message sending core. The BIU realizes one lock by multiplexing a bus error feedback register so as to complete the mutual exclusion access function to the same resource (i.e. RegFiles mentioned below).

The RegFiles element is configured to provide a plurality of element message storage register spaces. For each Postbox, the number of the message sending channels corresponds to the number of the groups of message storage registers. At the same time, more message registers also may be arranged according to the communication traffic determined by the application requirement, and different message registers are distinguished by addresses.

The IntGen element is configured to be responsible for generating an interrupt request to notify the receiving core of the arrival of a message. When it is detected that the receiving core has read the message, the interrupt request is automatically cleared. Hence, the operation of additionally arranging an interrupt clearing register for reading messages in the traditional method of communication between cores is avoided. Each interrupt line can be bundled with one or a group of Regfiles elements, so that the receiving core can enter a specific ISR (interrupt service routine) through the serial number of the interrupt request and read messages in corresponding RegFiles.

It should be noted that the Postbox in the device for communicating between cores in this embodiment has the mutual exclusion access protecting function that is not involved in the related art.

In the traditional multi-core communication method, the mutual exclusion operation needs to be performed using a mutual exclusion lock or a spinning lock when multiple cores occupy the same communication between cores resource. The Postbox realizes a lock register by multiplexing a bus error feedback register so as to complete a mutual exclusion access function, the operation is achieved as follows:

The BIU realizes a lock register by multiplexing a bus error feedback register. When the lock register is 0, it represents that the lock is in a release state, and when the lock register is 1, it represents that the lock is in an occupancy state. Under the normal circumstances, after the sending core writes Postbox RegFiles, the lock register automatically becomes 1. Then, the Postbox generates an interrupt to notify the receiving core, the receiving core performs Postbox RegFiles reading operation, and the lock register automatically becomes 0.

When the first abnormity happens, i.e. there is another sending core wants to perform writing operation on one Regfiles before the receiving cores performs Postbox RegFiles reading operation, when the message in the Regfiles is modified at this time, it will result in the lose of the previous messages. However, since the lock register in the Postbox in this example is 1, it represents that the lock is in an occupancy state, and therefore, the writing operation of the sending message is not successful, i.e., Postbox RegFiles information is not modified; at the same time, the lock register information 1 will be returned as an error response message to the sending core to notify that the sending core performs an abnormal operation. The cores enter abnormality processing, that is, the access may be continued after waiting for several instruction cycles. Until after the receiving core performs normal Postbox RegFiles reading operation, the lock register becomes 0, i.e. the lock is released, and the other sending cores may perform normal writing operation.

When the second abnormality happens, i.e. the message writing operation of a certain core happens while the receiving core is reading the message, the BIU enforces to read firstly and then write, i.e. the previous message is ensured to be read firstly, and then a new message can be written in, which ensures the reliability of the communication between cores.

(2) Bus Adapter (BA) Component

Since bus protocols of cores which communicate with each other may be different, furthermore, there are relatively many Postboxes which need to be accessed by the core; therefore, the ICN in this embodiment comprises several BA components which include a core read/write interface and several Postbox read/write interfaces, and the BA components complete the following two functions:

A. The adaptation of different core interface bus protocols to data read/write protocol in the ICN is completed.

B. According to a bus access Postbox address, the address is filtered, i.e. the effective data and effective control signals only appear on an internal interface of the Postbox with a unique address.

It can be seen that the external complex bus protocol can be isolated significantly by the BA component, only a simple and fast internal data read/write protocol is used at the interior, so that hardware delay of the device for communicating between cores is significantly reduced.

(3) Arbiter Component

When a plurality of cores in the Cluster initiate a message read/write access to one Postbox at the same time, a conflict will occur. Therefore, the ICN in this embodiment comprises several Arbiter components which include several message input interfaces and a message output interface. The Arbiter components are used for providing the following functions: the read/write access requests of several data channels are arbitrated according to a specific principle, i.e. the message read/write access requests which reach at the same time are serialized.

The Arbiter performs polling arbitration on the message read/write accesses which reach the arbiter component at the same time, i.e. a plurality of message read/write accesses which reach at the same time are serially output in order, or the priority arbitration is performed on the message read/write accesses which reach the arbiter component at the same time, i.e. a plurality of message read/write accesses which reach at the same time are serially output in a priority order from high to low.

Figure 11:
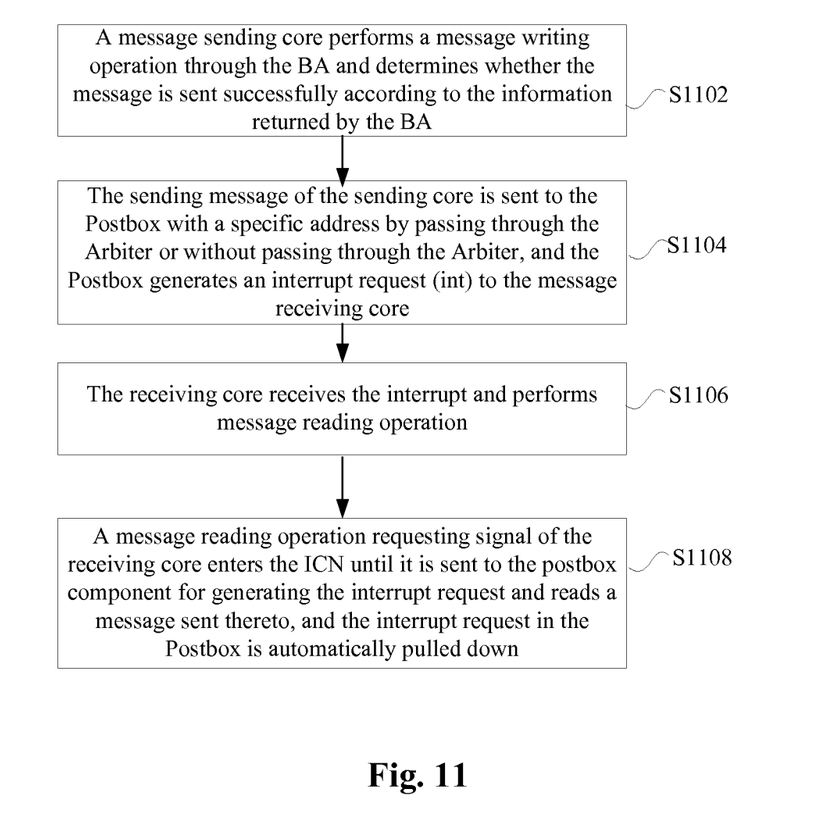
FIG. 11 is a flowchart of the method for communicating between cores according to an embodiment of the disclosure.

A method for communicating between cores is further provided in this embodiment, FIG. 11 is a flowchart of a method for communicating between cores according to an embodiment of the disclosure, as shown in FIG. 11, and the method comprises the following steps.

In step S1102, a message sending core performs a message writing operation through a BA and determines whether the message is sent successfully according to the information returned by the BA. The message writing operations of various cores are asynchronous and independent, without affecting one another. When Error Response information returned by the BA is invalid, the message is sent successfully; on the contrary, it represents that the Postbox is occupied, and the message is not written successfully. At the moment, the sending core can perform message writing operation again after delaying for several cycles, until the message is sent successfully.

In step S1104, the sending message of the sending core is sent to the Postbox with a specific address by passing through the Arbiter or without passing through the Arbiter, and the Postbox generates an interrupt request (int) to the message receiving core.

In step S1106, the receiving core receives the interrupt and performs message reading operation.

In step S1108, a message reading operation requesting signal of the receiving core enters the ICN until it is sent to the Postbox component for generating the interrupt request and the Postbox reads the message sent thereto, and the interrupt request in the Postbox is automatically pulled down.

The embodiments and the preferred implementations provided in the disclosure are of an instinctive mutual exclusion function, that is, the additional operations of applying for a lock and releasing a lock are not required before the communication between cores is performed. The mutual exclusion is fully completed by the read/write access of the ICN itself and an ERROR returning mechanism, so that the complexity of the communication between cores is significantly reduced, and the communication time delay is reduced, in addition, any initialization step is not needed, normal operation is conducted after power on reset is performed on the ICN, when entering the ICN, the message read/write request is completely managed by the ICN, so that the automated management is realized, and resources are greatly saved.

Using a distributed structure, some communication traffics may be limited within a bandwidth of a specific region without causing any impact on other traffic regions, furthermore, and the arbitration expense of a single arbiter component is significantly reduced, thereby significantly reducing the multi-core overall statistical communication time delay.

When the number of cores increases significantly, only a corresponding number of the three types components and corresponding interconnection lines need to be added, furthermore, the interconnection manners also can be selected flexibly according to the application requirement without affecting the existing structural features and software operating steps of the ICN, and thus excellent expandability and scalability are provided.

The embodiment of the disclosure will be further described below with combination of FIG. 10. It should be noted that multi-core is not limited to a CPU (central processing element) and a DSP (digital signal processor) illustrated in the embodiment.

The whole ICN uses a three-level structure to meet the application requirements of multi-core (10 cores in total) and heterogeneous core (6DSP+4ARM). The whole ICN includes 15 Postboxes, 10 BAs and 4 Arbiters, and the whole structure is as shown in FIG. 10. 3 DSPs form a Cluster. 2 CPUs form a Cluster. Because the data traffic is relatively small, the data path does not pass through the arbiter. Hence, the ICN can choose the number of the three types of components and the interconnection manner (such as directly connecting to the Postbox without passing through the arbiter in the embodiment) according to the number of cores and the communication traffic, thus without affecting the whole structural feature and the communication process of the ICN, and the expandability and scalability are excellent.

The Postbox is divided into a local postbox and a cross postbox according to responsible function regions. Specifically, there are several in this embodiment: 10 local Postboxes responsible for the communication between cores between the interior of the DSP cluster and the interior of the DSP cluster, 1 local Postbox responsible for the communication between cores between the DSP cluster and the CPU cluster, 1 Cross Postbox responsible for the communication between cores between the DSP clusters and/or 1 Cross Postbox responsible for the communication between cores between the CPU clusters. Hence, such a distributed structure may limit some communication traffics within a bandwidth of a specific region without causing any impact on other traffic regions, furthermore, the arbitration expense of a single arbiter component is significantly reduced, thereby significantly increasing the multi-core overall bandwidth efficiency and reducing the multi-core overall communication time delay. Meanwhile, when the number of cores significantly increases, it may result in that the communication between cores interrupt requests received by one core is too large, at the moment, a plurality of interrupt requests of the Postboxes can be combined by an OR Logic to reduce the number of inter-core interrupt requests reaching the core, so as to greatly increase the expandability of the ICN.

The three types of components included in the ICN are specifically implemented as follows:

(1) Postbox Component

Figure 12:
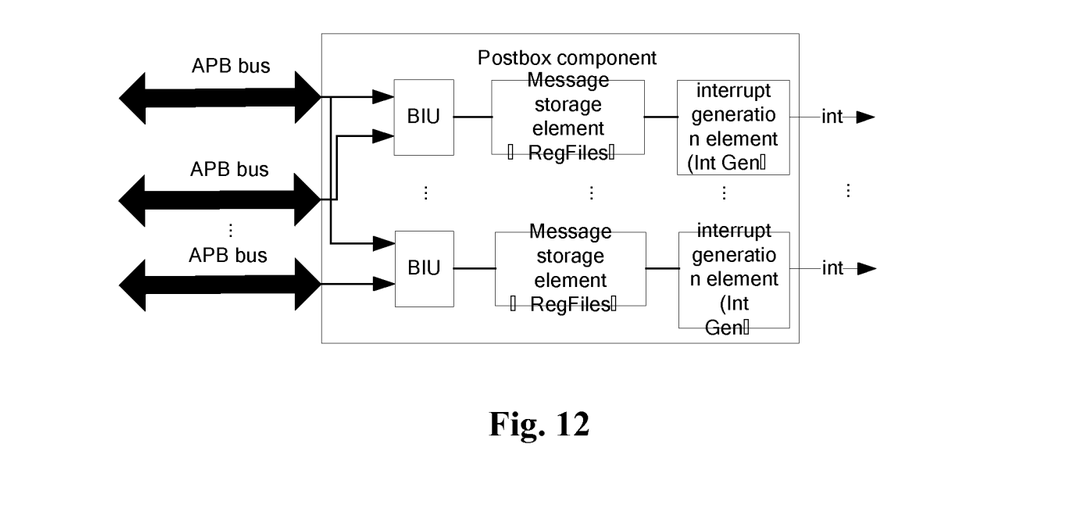
FIG. 12 is a structural block diagram of a postbox component in the device for communicating between cores according to an embodiment of the disclosure.

A message needs to be temporarily stored in some place for a receiving core to read, a reliable mechanism for notifying the receiving core of the arrival of the message is to be provided. Therefore, the ICN of the disclosure comprises several Postbox components. The following functions are provided:

message storage reading/writing messages mutually-exclusively generating and notifying an interrupt request FIG. 12 is a structural block diagram of a postbox component of the device for communicating between cores according to an embodiment of the disclosure, as shown in FIG. 12, the Postbox component comprises several BIU elements, several RegFiles elements and several IntGen elements. The various functional elements are as follows:

The BIU Element

The BIU element realizes the mutual exclusion access function of the read/write message. BUS0 is a message reading channel of the receiving core to which the Postbox belongs, BUS1-n are message writing channels of the sending core. The BIU realizes one lock by multiplexing a bus Error feedback register so as to complete a mutual exclusion access function to the same RegFiles element.

The RegFiles Element

The RegFiles element provides several element message storage register spaces. For each Postbox, the number of the message sending channels corresponds to the number of the groups of message storage registers. At the same time, more message registers also may be arranged according to the communication traffic determined by the application requirement, different message registers being distinguished by addresses.

The IntGen Element

The IntGen element is responsible for generating an interrupt request to notify the receiving core upon the arrival of a message. When it is detected that the receiving core has read the message, the interrupt request is automatically cleared. Hence, the operation of additionally arranging an interrupt clearing register for reading messages in the traditional method of the communication between cores is avoided. Each interrupt line can be bundled with one or a group of Regfiles elements, so that the receiving core can enter a specific ISR (interrupt service routine) and read the messages in the corresponding RegFiles by the serial number of the interrupt request.

It should be specially stressed that the Postbox in this device for communicating between cores is of a mutual exclusion access protecting function that is not involved in the related art.

In the traditional multi-core communication method, the mutual exclusion operation needs to be performed by using a mutual exclusion lock or a spinning lock when multiple cores occupy the same communication between cores resource. The Postbox realizes a lock register so as to complete a mutual exclusion access function by multiplexing a bus error feedback register, which is specifically achieved as follows:

The BIU realizes a lock register by multiplexing an error feedback register. When the lock register is 0, it represents that the lock is in a release state, and when the lock register is 1, it represents that the lock is in an occupancy state. Under normal circumstances, after the sending core writes Postbox RegFiles, the lock register automatically becomes 1. Then, the Postbox generates an interrupt to notify the receiving core, the receiving core performs Postbox RegFiles writing operation, and the lock register automatically becomes 0.

When the first abnormity happens, i.e. there is another sending core wants to perform writing operation on one Regfiles before the receiving cores performs Postbox RegFiles reading operation, when the message in the Regfiles is modified at this time, it will result in the lose of the previous messages. However, since the lock register in the Postbox in the present in this embodiment is 1, it represents that the lock is in an occupancy state, and therefore, the writing operation of the sending message is not successful, i.e., the information of the Postbox RegFiles is not modified; at the same time, the lock register information 1 will be returned as an error response message to the sending core to notify that the sending core performs an abnormal operation. The cores enter abnormality processing, that is, the access is continued after waiting for several instruction cycles. Until the receiving core performs normal Postbox RegFiles reading operation, the lock register becomes 0, i.e. the lock is released, and the other sending cores may perform normal writing operation.

When the second abnormity happens, i.e. the message writing operation of a certain core happens while the receiving core is reading the message, the BIU enforces to read firstly and then write, i.e. the previous message is ensured to be read firstly, and then a new message can be written in, which ensures the reliability of the communication between cores.

When being realized, the lock register is a slave device Error information generating register, i.e. the mutual exclusion function elements such as a mutual exclusion lock and a semaphore do not need to be additionally added, the operation of applying for a lock succeeds, i.e. the message sending operation succeeds, and the lock is released successfully, i.e. the message is read successfully, the message fails to apply for a lock, i.e. the bus feeds back an Error response, i.e. the mutual exclusion processing mechanism is consistent with a bus universal read/write mechanism, i.e. a mutual exclusion operation cycle does not need to be added additionally, and the programming complexity and the communication time delay are significantly reduced. Therefore, the device and the method shown in the above embodiments and preferred implementations realize mutual exclusion access protection for the communication between cores resources.

(2) Bus Adapter (BA) Component

Since the bus protocols of cores which communicate with each other may be different, furthermore, there are relatively many Postboxes which need to be accessed by the core; therefore, the ICN in the disclosure comprises several BA components which include a core read/write interface and several Postbox read/write interfaces for completing the following two functions:

A. The adaptation of different core interface bus protocols to the data read/write protocol in the ICN is completed.

B. According to a bus access Postbox address, the address is filtered, i.e. the effective data and effective control signals only appear on an internal interface of the Postbox with a unique address.

It can be seen that the external complex bus protocol can be isolated significantly by the BA component; only a simple and fast internal data read/write protocol is used at the interior, so that hardware delay of the device for communicating between cores is significantly reduced.

Figure 13:
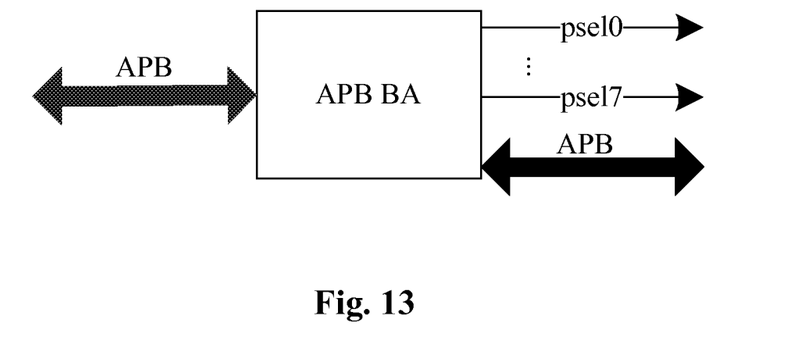
FIG. 13 is a structural block diagram of a bus adapter component in the device for communicating between cores according to an embodiment of the disclosure.

In this embodiment, a relatively simple Advanced Peripheral Bus (APB) protocol is used both inside and outside, FIG. 13 is a structural block diagram of a bus adapter component in the device for communicating between cores according to an embodiment of the disclosure, as shown in FIG. 13, the BA enables to output different APB selection signals according to the fact whether the access address of the APB matches with the register address of the Postbox, so as to select different message accesses. The APB interface is readable and writable, and the cores perform message read/write operations on the Postbox through the APB interface.

(3) Arbiter Component

Figure 14:
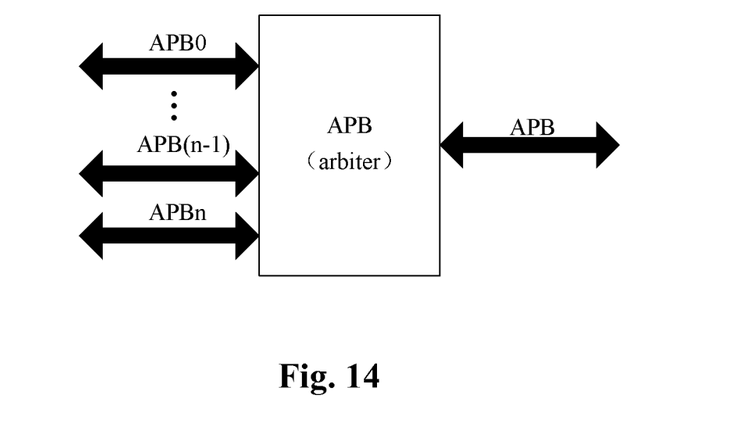
FIG. 14 is a structural block diagram of an arbiter component in the device for communicating between cores according to an embodiment of the disclosure.

A conflict will happen when a plurality of cores in the Cluster initiate a message read/write access to one Postbox at the same time. Therefore, the ICN of the disclosure comprises several Arbiter components, FIG. 14 is a structural block diagram of an arbiter component in the device for communicating between cores according to an embodiment of the disclosure, as shown in FIG. 14, the arbiter component comprises several message input interfaces and a message output interface. The Arbiter components provide the following functions: the read/write access requests of several data channels are arbitrated according to a specific principle, i.e. the message read/write access requests which reach at the same time are serialized.

The Arbiter performs polling arbitration on the message read/write accesses which reach the arbiter component at the same time, i.e. a plurality of message read/write accesses which reach at the same time are serially output in order, i.e. the polling arbitration is performed between different data paths having message read/write requests, i.e. only one data path having a request can be selected once, after the read/write access is completed, then the next data path having the message read/write request is selected, by analogy, until the message read/write requests of all the paths are processed completely.

Meanwhile, the priority arbitration can be performed on the message read/write accesses which reach the arbiter component at the same time, according to the operation mode configured by the module, i.e. a plurality of message read/write access requests which reach at the same time are performed in a priority order from high to low.

The steps of the method for communicating cores by applying the device for communicating between cores are as follows:

The message sending core performs a message writing operation through the BA and determines whether the message is sent successfully according to the information returned by the BA. The message writing operations of various cores are asynchronous and independent, without affecting one another. When the Error Response information returned by the BA is invalid, the message is sent successfully; on the contrary, it represents that the Postbox is occupied, and the message is not written successfully. At this moment, the sending core can perform message writing operation again after delaying for several cycles, until the message is sent successfully.

The sending messages of several sending cores are sent to the Postbox with a specific address by passing through the Arbiter or without passing through the Arbiter, and the Postbox generates an interrupt request (int) to the message receiving core. When the number of the cores which communicate with one another is relatively small, the message read/write may not pass through the Arbiter.

The receiving core receives the interrupt and performs a message reading operation.

A message reading operation requesting signal of the receiving core enters the ICN until it is sent to the Postbox for generating the interrupt request, and the Postbox reads a message sent thereto, and the interrupt request in the Postbox is automatically pulled down (i.e. the interrupt request corresponding to the message which has been read is automatically cleared).

The inter-core method of the disclosure is described using the following three examples:

A: The message communication process in the CLUSTER under the general application:

1. A message sending core DSP2 sends a message to a Postbox0 which belongs to a destination core DSP0.

2. The Postbox0 generates an interrupt request to the DSP0.

3. The DSP0 enters an ISR and reads the message in the Postbox.

B. The process for both the message communication crossing the CLUSTER and the message communication in the CLUSTER under the general application:

1. A message sending core in the DSP cluster0 sends a message to the Postbox0 which belongs to the destination core DSP0; the message sending cores DSP3, 4 of a DSP cluster 1 both have messages which need to be sent to DSP cluster0 DSP0. Therefore, the arbitration is firstly performed by an Arbiter2 in the DSP cluster1, assuming that a core DSP3 acquires an arbitration power, the message is firstly written to the Postbox of the DSP CLUSTER0, then a message sending core DSP4 acquires the arbitration power and writes the message to the Postbox of the DSP CLUSTER0.

2. Both the Postbox0 in the DSP CLUSTER0 and the Postbox of the DSP CLUSTER0 generate an interrupt request at the same time.

3. The DSP0 enters the ISR, according to the priority set by software, assuming that the message in the Postbox0 is read firstly, and then the message in the Postbox of the DSP CLUSTER0 is read.

C. The process of the communication between cores crossing the CLUSTER when the mutual exclusion protection mechanism takes into effect:

1. A CPU CORE0 sends a message to a CPU&DSP cross Postbox by a BA6.

2. The CPU&DSP cross Postbox generates an interrupt request to a DSP5, the DSP5 does not process the interrupt in time because of having an affair of a higher priority to be performed, i.e. message reading is not performed.

3. The CPU CORE0 sends a message to the CPU&DSP cross Postbox again by the BA6; however, the ERROR information is returned, it represents that a communication resource lock is not released, and the message is not sent successfully; the CPU CORE0 performs message sending operation again after entering a waiting cycle.

4. The DSP5 reads the first message successfully after having completed the affair with the higher priority.

5. The CPU CORE0 successfully sends a second message, i.e. the returned ERROR information is invalid. Then the CPU core0 successfully reads the second message. It can be seen that an additional mutual exclusion protection mechanism is not needed in the process of the communication between cores, i.e. reliable communication between cores is achieved.

It should be noted that in the practical process of the communication between cores, it is possible to have the above three cases or a more complex communication scenario.

In addition, the three components included in the communication between cores in the embodiment of the disclosure and the connection and interaction relationship thereof are the key to solve the technical problems in the related art; and it also would be obvious that the method for communicating between cores of the embodiment of the disclosure is also distinguished from the related art. There is an instinctive mutual exclusion function in the embodiments and preferred implementations, that is, the additional operations of applying for a lock and releasing a lock are not required before the communication between cores is performed, the mutual exclusion is fully completed by the read/write access of the ICN itself and an ERROR returning mechanism, in addition, any initialization step is not needed. The normal operation is conducted after power on reset is performed on the ICN, when entering the ICN, the message read/write request is completely managed by the ICN, so that the complexity of the communication between cores is significantly reduced, and the communication time delay is reduced; by using a distributed structure, the device for communicating between cores may limit some communication traffics within a bandwidth of a specific region without causing any impact on other traffic regions and significantly reduces the arbitration expense of a single arbiter component, thereby significantly reducing the inter-core overall statistical communication time delay, and when the number of the cores increases significantly, by means of the embodiments and preferred implementations, only a corresponding number of the three types of components and corresponding interconnection lines need to be added, furthermore, the interconnection manners also can be selected flexibly according to the application requirement without affecting the existing structural features and software operating steps of the ICN, and thus excellent expandability and scalability are provided.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for those skilled in the art; the disclosure may have various changes and variations. Any amendments, equivalent substitutions, improvements, etc. within the principle of the disclosure are all comprised in the scope of the protection of the disclosure.

What is claimed is:

1. A device for communicating between cores, comprising:
   a postbox component, performed by the hardware processor, configured to store a message sent from a message sending core to a message receiving core and notify the message receiving core to read the message; and
   a bus adapter, connected between the postbox component and the message receiving core and the message sending core which communicate with each other and configured to provide read/write interfaces of the postbox component and the message receiving core and the message sending core;
   wherein the postbox component comprises: a bus interface element, configured to achieve a mutual exclusion of a read/write message by multiplexing a bus error feedback register; wherein the bus interface element comprises: a first mutual exclusion element, configured to achieve a function of a mutual exclusion lock by multiplexing the bus error feedback register, so as to achieve a mutual exclusion of a plurality of message sending cores writing messages to the postbox component; and/or a second mutual exclusion element, configured to achieve a function of a mutual exclusion lock by multiplexing the bus error feedback register, so as to achieve a mutual exclusion of a message sending core writing a message to the postbox component and a message receiving core reading a message from the postbox component;
   a triggering subelement, configured to trigger a state of the bus error feedback register to change after the message sending core writes a message to the postbox component, or the message receiving core reads a message from the postbox component,
   the postbox component sends a first response message to the message sending core after the message sending core writes a message to the postbox component, wherein the message sending core determines that the message sending core successfully writes the message to the postbox component according to the first response message; and/or
   the postbox component sends a second response message to the message receiving core after the message receiving core reads a message from the postbox component, wherein the message receiving core determines that the message receiving core successfully reads the message according to the second response message.

2. The device according to claim 1, further comprising:
   an arbiter component, configured to, when a plurality of cores simultaneously initiate read/write access requests for requesting a read/write message to the postbox component, arbitrate a plurality of read/write access requests according to a predetermined rule and output the plurality of read/write access requests serially and sequentially.

3. The device according to claim 1, wherein the postbox component comprises:
   a storage element, configured to store the message according to a message access address.

4. The device according to claim 1, wherein the postbox component comprises:
   a notifying element, configured to notify the message receiving core to receive a message by an interrupt request.

5. A method for communicating between cores, comprising:
   receiving, by a postbox component, a message sent from a message sending core through a bus adapter component; and
   sending, by the postbox component, an interrupt request to a message receiving core, wherein the message receiving core reads the message according to the interrupt request;
   wherein when a plurality of cores simultaneously initiate read/write access requests for requesting a read/write message to the postbox component, achieving a mutual exclusion of the read/write message by multiplexing a bus error feedback register; wherein achieving the mutual exclusion of the read/write message by multiplexing a bus error feedback register comprises: achieving a function of a mutual exclusion lock by multiplexing the bus error feedback register, so as to achieve a mutual exclusion of a plurality of message sending cores writing messages to the postbox component; and/or achieving a function of a mutual exclusion lock by multiplexing the bus error feedback register, so as to achieve a mutual exclusion of a message sending core writing a message to the postbox component and a message receiving core reading a message from the postbox component;
   triggering a state of the bus error feedback register to change after the message sending core writes a message to the postbox component, or the message receiving core reads a message from the postbox component;
   the postbox component sends a first response message to the message sending core after the message sending core writes a message to the postbox component, wherein the message sending core determines that the message sending core successfully writes the message to the postbox component according to the first response message; and/or
   the postbox component sends a second response message to the message receiving core after the message receiving core reads a message from the postbox component, wherein the message receiving core determines that the message receiving core successfully reads the message according to the second response message.

6. The method according to claim 5, further comprising: when a plurality of cores simultaneously initiate read/write access requests for requesting a read/write message to the postbox component, arbitrating a plurality of read/write access requests according to a predetermined rule and outputting the plurality of read/write access requests serially and sequentially.

7. The method according to claim 5, further comprising clearing, by the postbox component, the interrupt request after the message receiving core receives the message.

8. A device for communicating between cores, comprising:
 a receiving element, located in a postbox component, configured to receive a message sent from a message sending core through a bus adapter component; and
 a sending element, located in the postbox component, configured to send an interrupt request to a message receiving core, wherein the message receiving core reads the message according to the interrupt request;
 a bus interface element, located in the postbox component, configured to achieve a mutual exclusion of a read/write message by multiplexing a bus error feedback register; wherein the bus interface element comprises: a first mutual exclusion element, configured to achieve a function of a mutual exclusion lock by multiplexing the bus error feedback register, so as to achieve a mutual exclusion of a plurality of message sending cores writing messages to the postbox component; and/or a second mutual exclusion element, configured to achieve a function of a mutual exclusion lock by multiplexing the bus error feedback register, so as to achieve a mutual exclusion of a message sending core writing a message to the postbox component and a message receiving core reading a message from the postbox component;
a triggering subelement, configured to trigger a state of the bus error feedback register to change after the message sending core writes a message to the postbox component, or the message receiving core reads a message from the postbox component,
the postbox component sends a first response message to the message sending core after the message sending core writes a message to the postbox component, wherein the message sending core determines that the message sending core successfully writes the message to the postbox component according to the first response message; and/or
the postbox component sends a second response message to the message receiving core after the message receiving core reads a message from the postbox component, wherein the message receiving core determines that the message receiving core successfully reads the message according to the second response message.

* * * * *